Feb. 15, 1938.  H. FOLKERS  2,108,663
ELECTRODE FOR WINDMILL GENERATORS
Filed Nov. 25, 1936
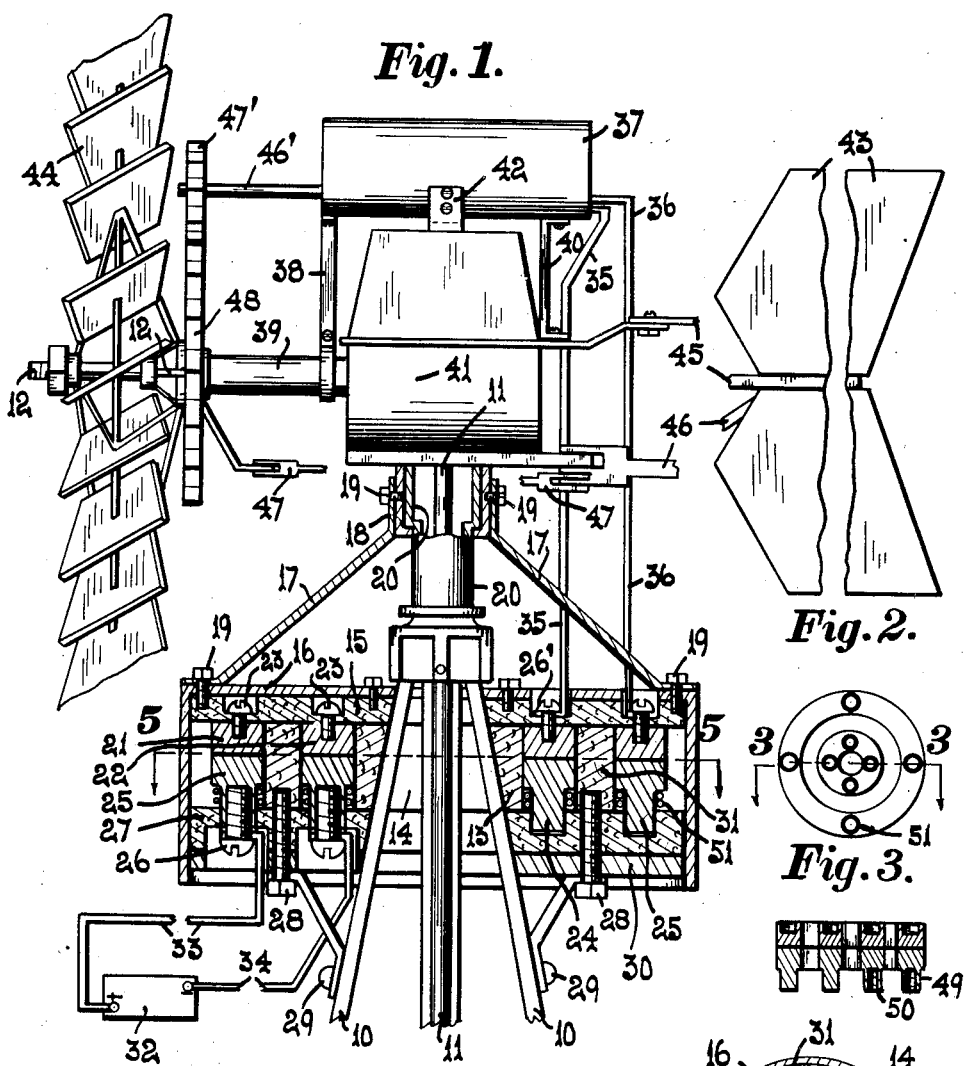
Fig. 1.
Fig. 2.
Fig. 3.
Fig. 4.
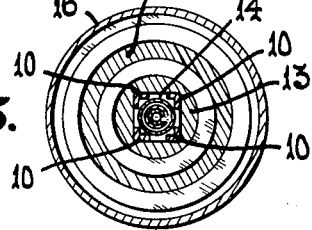
Fig. 5.
Inventor
*Herman Folkers.*
By Arthur H. Sturges
Attorney Patented Feb. 15, 1938

2,108,663

UNITED STATES PATENT OFFICE 2,108,663

ELECTRODE FOR WINDMILL GENERATORS

Herman Folkers, Omaha, Nebr.

Application November 25, 1936, Serial No. 112,773

2 Claims. (Cl. 290—44)

The present invention relates to windmill generators and more particularly to an arrangement thereof for charging storage batteries.

It is an object of the invention to provide swivel connections between a battery and the generator of a mill, the electrodes of which are so arranged that the paddles and generator of the mill may rotate horizontally or continuously in one direction or in a reverse direction as may be occasioned by changes in the direction of the wind without interrupting the flow of charging energy from the generator to and from a battery and without twisting or breaking the wire connections between said electrodes and the battery.

Another object of the invention is to provide a simple construction for the above stated purposes which is certain of operation and of few and economical parts which require no adjustment or attention subsequent to an installation thereof.

Other and further objects and advantages of the invention will be understood from the following detailed description thereof, reference being had to the accompanying drawing in which:

Figure 1 is a fragmentary side elevation partly in section of a windmill embodying the present invention carried by a mast the latter being fragmentarily illustrated.

Figure 2 is a top plan view on a reduced scale of certain annular electrodes employed.

Figure 3 is a transverse sectional view taken on line 3—3 of Figure 2 of said electrodes.

Figure 4 is a side elevation on a reduced scale of a modification of a mounting which may be employed for the said electrodes.

Figure 5 is a transverse sectional view taken on line 5—5 of Figure 1.

As heretofore practiced in the art windmills have been employed for driving generators for the purpose of charging batteries through electrical connections or wires in communication between a battery and a generator, the latter being on top of the mill and the batteries on the ground or in adjacent buildings or dwellings remote from the mill and said wires have become twisted and broken resultant from the windmill turning continuously in one horizontal direction, thereby twisting and breaking said wires, said mills often being positioned in isolated relation with respect to a farm house and not susceptible of being readily inspected by the owner have resulted in the batteries becoming completely discharged resultant from said wires becoming broken with attendant lack of lighting about a farm house, barn or the like. Also in instances where a mill is provided with detents for preventing the generator and paddles from describing a complete horizontal turning movement for preventing breaking of said wires, the same also often prevents the vertically disposed paddles of the mill from being presented to the line of travel of the wind at a right angle whereby the generating efficiency of the mill is lessened, and it is an object of the present invention to provide means for obviating the undesirable practices of the prior art.

Referring now to the drawing for a more particular description the numeral 10 indicates the legs of a mast which may be of any desired height or size, four thereof being preferably employed.

A pump or plunger rod 11 is medially positioned with respect to the legs 10 and is adapted to pump water in a well known manner, the present invention being adapted to be assembled upon windmills which have been installed for pumping water as well as windmills erected specifically for the purpose of charging batteries. The pump rod 11 derives its motion from the shaft 12 of the paddle wheel through certain conventional gears not illustrated.

The present invention includes a support 13 having a medially disposed aperture 14 which is rectangular in plan, the opposite ends of said aperture being of different areas, the smaller end being positioned above on the mast as shown in Figure 1, whereby the shape of the walls of the aperture 14 cooperate with the inclined outwardly divergent angle iron legs 10 of the mast for supporting a horizontally disposed plate 15, the latter in turn carrying a housing 16.

The housing 16 is maintained horizontally disposed by means of member 17, opposite ends of which are respectively connected to the housing 16 and to a revoluble sleeve 18 by means of the bolts or keepers 19. The sleeve 18 is adapted to have revoluble movements with respect to a standard 20, the latter being held stationary by any suitable means such as securing it to the upper ends of the legs 10. The plate 15 carries an annular ring electrode 21 and a like smaller electrode 22 by means of the keepers or screws 23 whereby revoluble movements of the sleeve 18 and housing 16 impart corresponding movements to the electrodes 21 and 22 which are respectively in contact with lower annular electrodes 24 and 25, the latter being held stationary at all times by means of screws or keepers 26 which join them to a lower plate of insulation 27, the latter in turn being held stationary by means of bolts 28 which are secured to braces and the latter by means of rivets 29 to the legs 10 of the mast or disc 30

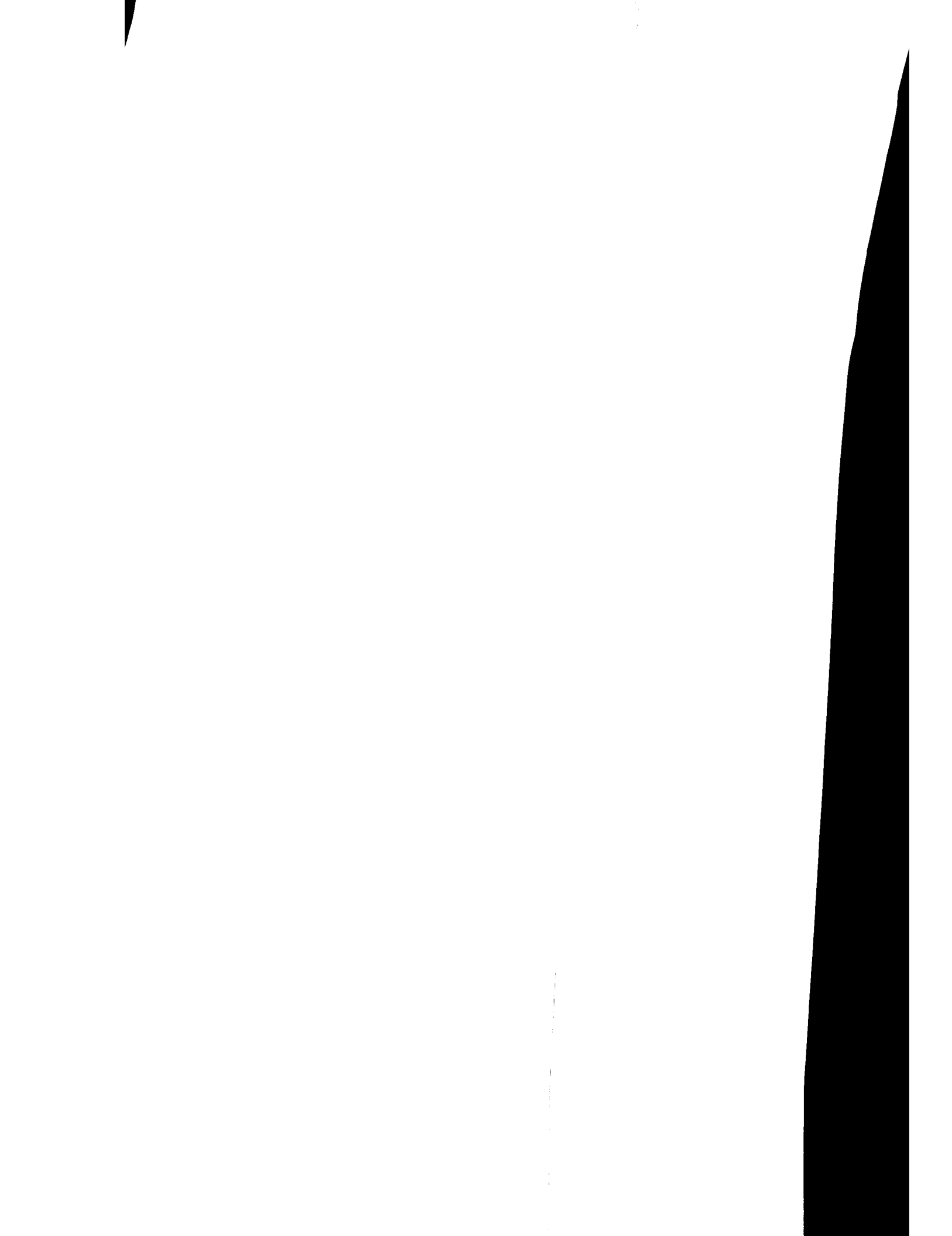

said supporting member, a plurality of arms fixed to said legs and to said insulating plate, a pair of annular electrodes carried by said insulating plate and cooperating with said first pair of electrodes, electrical connections between said first pair of electrodes and the generator, electrical connections between the second pair of electrodes and the battery, said second pair of electrodes having downwardly extending lugs of reduced cross sectional area to provide downwardly facing shoulders, said insulating plate having apertures for receiving said lugs, and expanding springs surrounding said lugs and engaging said shoulders and insulating plate to maintain at all times a good electrical contact between the corresponding electrodes of the pairs of electrodes.

HERMAN FOLKERS.